Sept. 21, 1943.  E. W. CARROLL  2,329,980
ORIENTATION MEANS USING CARRIERS
Filed June 6, 1941  2 Sheets-Sheet 1
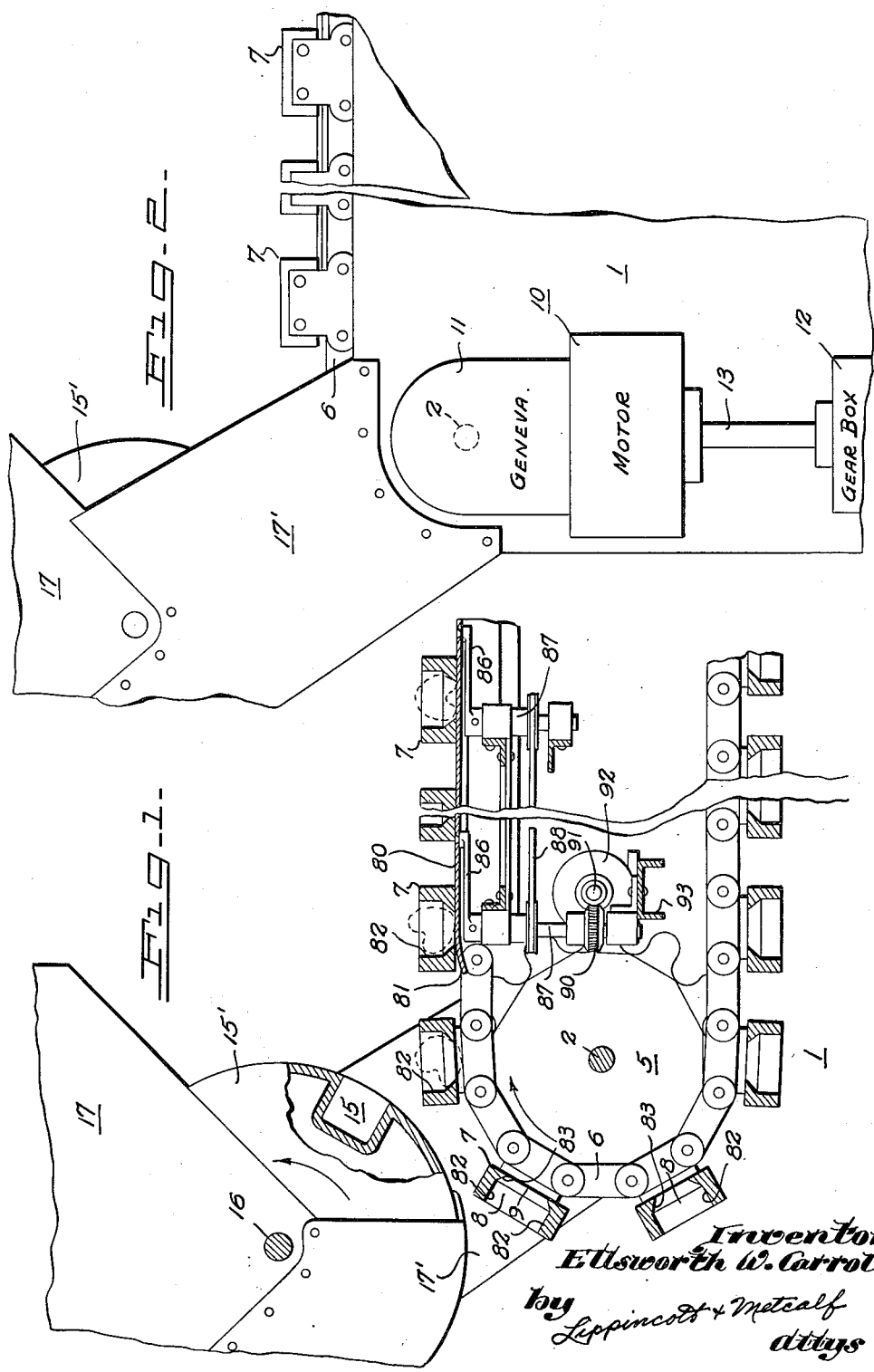

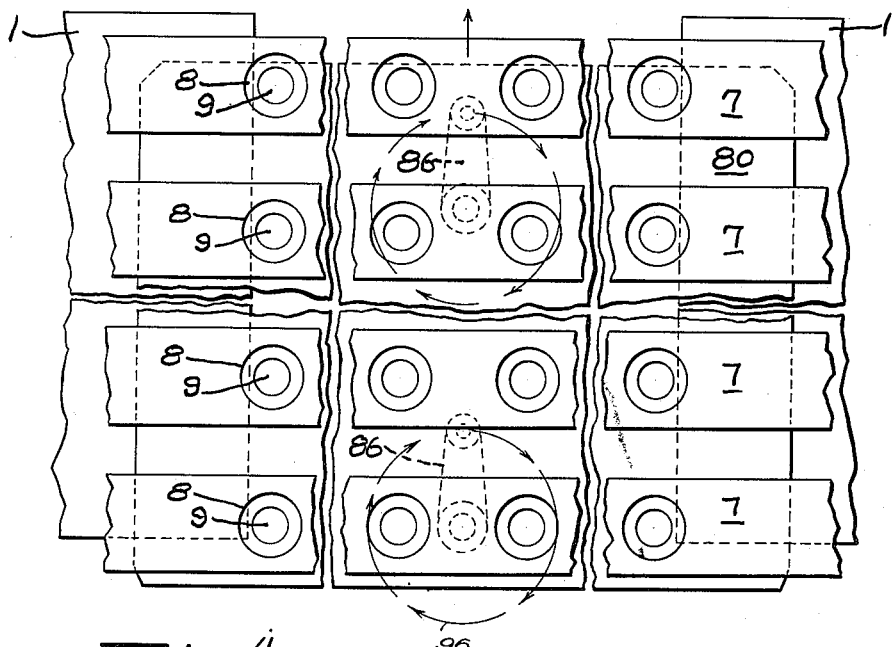
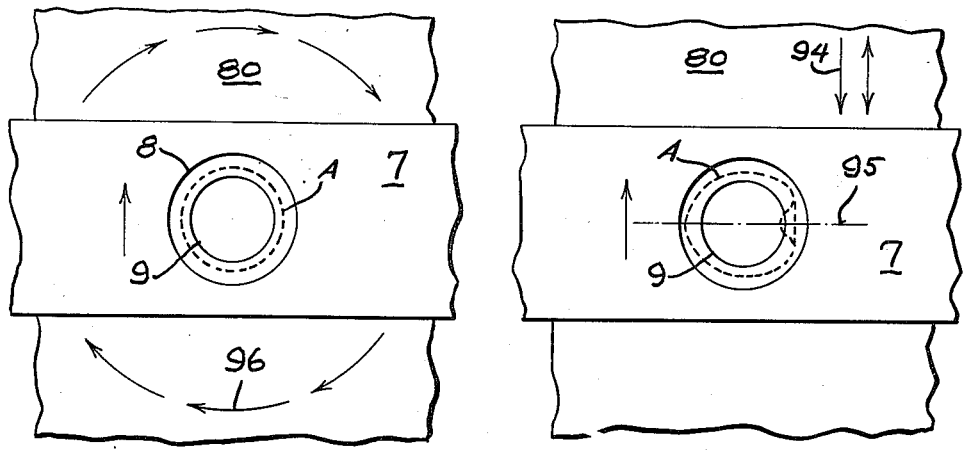

Patented Sept. 21, 1943

2,329,980

UNITED STATES PATENT OFFICE 2,329,980

ORIENTATION MEANS USING A CARRIER

Ellsworth W. Carroll, San Carlos, Calif., assignor to S & W Fine Foods, Inc., San Francisco, Calif., a corporation of California Application June 6, 1941, Serial No. 396,810

7 Claims. (Cl. 198—33)

My invention relates to orienting and pitting means and more particularly to a simple and efficient orienting structure to be utilized in conjunction with a carrier.

The main object of my invention is to provide a simple and effective fruit orienting device for use in conjunction with a movable carrier. Another object of my invention is to provide an orienting device which will operate either with an intermittently progressed or a continuously progressed carrier to give a high percentage of properly oriented fruit. Another object of my invention is to provide a simple fruit orienting device that will properly orient a high percentage of elongated fruit.

Other objects of my invention will be apparent or will be specifically pointed out in the description forming a part of this specification, but I do not limit myself to the embodiment of the invention herein described, as various forms may be adopted within the scope of the claims.

In the drawings:

Fig. 1 is a view partly in section and partly in elevation of a preferred embodiment of my invention.

Fig. 2 is a side elevational view of the device of Fig. 1.

Fig. 3 is a fragmentary top plan view of carrier bars, fruit receptacles, and orienting plate.

Figs. 4 and 5 are diagrammatic views showing the operation of the orienting plate.

Referring directly to the drawings for a more detailed description of my invention, a pair of spaced side frames 1 are positioned to journal a front drive axle 2. Mounted on said drive axle adjacent side members 1 are gears 5, each lateral pair of gears engaging a chain 6. Chains 6 are cross connected by a plurality of carrier bars 7 fastened to the chains and progressed thereby. Each carrier bar is provided with a plurality of fruit-receiving recesses 8 having bottom apertures 9. Chains 6 are progressed intermittently in the usual manner, the drive axle being rotated clockwise as viewed in Figs. 1 and 2 by motor 10 through a Geneva movement 11. Motor 10 also drives a gear box 12 through a shaft 13 and gear box 12 drives a lower, continuously rotating power shaft extending beneath the machine (not shown) for operating other portions of the structure through cams and gears, as is customary in the art. The top portion of the carrier, comprising chains and carrier bars, is directed by side members 1 over a substantially horizontal path, and as each bar approaches the horizontal plane, each fruit receptacle 8 is loaded with a fruit from a drum receptacle 15, the drum 15' rotating counter-clockwise on axle 16 in tangential relation to the carrier, this drum and hopper 17 being mounted on a pair of side arms 17' attached to side members 1 of the machine. This drum type loader has been shown, described, and claimed in my prior Patent No. 2,208,474, issued July 16, 1940, and loads the fruit into the receptacles with a minimum of damage.

The carrier bars intermittently progress across the top of the machine over a substantially horizontal path, and I prefer to have from 8 to 10 bars in the horizontal plane at the same time. However, the length of the upper horizontal path may be varied in accordance with a desired design.

The present device utilizes an entirely novel orienting mechanism, and a type of orienting system that has been found to be very efficient in orienting cherries, particularly when there is a percentage of elongated fruit in the mass of fruit being run through the machine. The orienting structure will be described first, and its operation afterwards.

A flat orienting plate 80 is horizontally positioned between chains 6 so that the bottom surfaces of the bars 7 as they pass along the horizontal path are either closely adjacent, or rest on the plate. The leading edge of the plate is provided with a turn-down edge 81, to prevent cherries in the bars 7 passing on to the plate from being bruised. A preferred shape of the receptacle recesses in the bars is shown in the Figure 1, where the recesses each have a cylindrical side wall 82 and a conical bottom 83, with a central aperture 9 therein. The recess dimensions are so designed with respect to the grade of fruit being run through the machine that a fruit presenting its convex surface to the apertures 9 would normally project below the plane of the bottom of the bars, so that when the bars are over plate 80 such fruit will contact and be partially supported on the orienting plate. If the stem indent area of the fruit is presented to the conical bottom 83, the fruit will be supported almost solely by the conical bottom and will not touch or only lightly contact the orienting plate 80.

I have found that for 21 mm. fruit (cherries are customarily graded in millimeters diameter) the side walls, for example, may be of one inch diameter, the conical bottom may have an inclination of 45° to the vertical converging to a ⅝ inch bottom aperture. Similar relationships are satisfactory for larger or smaller fruit.

Thus, the fruit presenting a convex surface to plate 80 may be frictionally driven and rotated by relative motion of the plate and carrier bar until the stem indent of the fruit is presented to the plate in which position the fruit is in stable position on the conical bottom 83. The type of relative motion of the plate and the carrier bar is important and will be described in detail. If the plate were to be held stationary and the bars were then progressed either continuously or intermittently across the plate there would, of course, be relative motion during progression, and the fruit would be rotated to some extent. I find, however, that the mere progression of the bars across the plate is not sufficient to cause satisfactory orienting of the fruit and I, therefore, prefer in addition to progressing the bars across the plate, to move the plate, and I move the plate in a particular manner with respect to the bars, giving the plate a motion not only in the direction that the bars are progressing, but also in a direction at right angles to the line of progression of the bars. I prefer to give the plate, for example, a circular motion, by attaching the plate to a pair of plate-driving arms 86, rotated by vertical shafts 87, these shafts being interconnected by belt 88. One of the shafts 87 is driven through worm gear 90 by cross shaft 91, which may be separately driven by motor 92 inside the machine, motor 92 being mounted on motor bar 93. Thus, I am able to move plate 80 so that all points thereon will follow a circular path as shown by the arrows 96 in Figs. 3 and 4. The diameter of this circular path is preferably made to be longer than the average peripheral measurement of the cherries being passed through the machine, for reasons later to be discussed. A circular movement of plate 80 is not necessary, as irregular paths may be given to the plate by cams if desired. The main desideratum is that motion be provided both across and along the line of carrier bar progression. In some cases where continuous carrier progression is used the plate need only be moved at right angles to the line of progression.

Having thus described the mechanism of my invention, I shall now describe the operation. Fruit from hopper 17 is deposited in drum delivery apertures 15 and thence delivered to the carrier bars in proper sequence, so that each recess 8 in each carrier bar is loaded as each carrier bar approaches the hoizontal plane. Further progression of the chains brings a number of loaded carrier bars immediately over the orienting plate 80. Orienting plate 80 is being moved in such a manner that there is a crosswise component to the relative movement between the plate and the bars, as well as a lengthwise component.

By so extending the plate 80 so that a number of bars are on the plate at the same time, I am able to subject the fruit to an extended action of the orienting plate. For example, if 10 bars are over the plate 80 at the same time, and the cycle time of the machine is one or two seconds, then the fruit will be subjected to orienting for 10 to 20 seconds, irrespective of whether the bars are moving intermittently or continuously. The movement of the bars over the orienting plate 80, while the latter is being moved over circular path 96, merely shortens the stroke of the plate in one direction and lengthens it in the other, and I have found that there is, even when the bars are progressed intermittently, a continuous fruit rotation operating to straighten the fruit to bring the stem indent down.

I have also found that it is practically impossible, with the described motion of the orienting plate 80, for the fruit to remain in a position where it will rotate stably around the long axis of the fruit. The application of the rotating force is continually changing in direction with respect to long fruit axis, and thus fruit which is even considerably elongated will become properly oriented. The speed of rotation of crank shaft 87 is made sufficiently rapid that the fruit cannot twist and remain in stable rotation with its long axis at a right angle to the circular path, but slow enough to prevent bouncing of the fruit.

Obviously, whenever a fruit being subjected to the orienting rotation becomes oriented, it no longer is rotated because of the fact that the orienting plate 80 no longer contacts the fruit, or if it does, it does not contact it with sufficient friction to cause further rotation. Thus practically every normal fruit which is oriented stays oriented as long as the same remains on the carrier.

Thus it will be seen that the present invention is directed to a simple orienting mechanism which can operate on the fruit in a carrier during one or more pitting cycles of the machine, irrespective of whether the carrier is continuously or intermittently progressed, and which operates on the fruit to disturb any tendency thereof for it to rotate stably around any one axis. The device is, therefore, ideally adapted to orient fruit having a long axis passing through the stem indent, which do have such a tendency.

I claim:

1. A machine for positioning indented fruit, said machine comprising a cup-like receptacle member for supporting a fruit positioned therein, said receptacle having a bottom aperture therein permitting but a minor portion of such fruit to protrude therethrough, a separate member adjacent to and blocking said aperture to contact with a protruding portion of such fruit, and means moving said separate member over a curvilinear path in a plane substantially parallel to the plane of said aperture, said path having an extent in each of two normal directions substantially as long as the average periphery of such fruit.

2. A machine for positioning indented fruit, said machine comprising a cup-like receptacle member for supporting a fruit positioned therein, said receptacle having a bottom aperture therein permitting but a minor portion of such fruit to protrude therethrough, a flat plate member extending across said bottom aperture to contact with such protruding fruit, and means for moving said plate member in a curvilinear path in a plane substantially parallel to the plane of said aperture.

3. In a device for orienting indented fruit, a receptacle member having a plurality of concave recesses therein, each of said recesses having a bottom aperture therein less than the average diameter of said fruit, and a flat plate member positioned below and adjacent all of said apertures, and means for moving said plate member relative to said receptacle member over a curvilinear path in the plane of said plate member.

4. In a device for orienting indented fruit, a receptacle member having a plurality of concave recesses therein, each of said recesses having a bottom aperture therein less than the average diameter of said fruit, and a flat plate member positioned below and adjacent all of said apertures, and means for moving said plate member relative to said receptacle member over a closed curvilinear path in the plane of said plate member.

5. Means for orienting fruit having a stem indent, which comprises a pair of endless conveyor members movable along a horizontal plane, cross bars connecting said conveyor members, said bars having concave fruit receiving recesses therein, said recesses having coplanar lower apertures smaller than the diameter of fruit to be received in said recess, means for moving said conveyors and said bars along said plane, a flat plate below and immediately adjacent the bars passing along said plane, and means for moving said plate cyclically across the line of progression of said bars.

6. Means for orienting fruit having a stem indent, which comprises a pair of endless conveyor members movable along a horizontal plane, cross bars connecting said conveyor members, said bars having concave fruit receiving recesses therein, said recesses having coplanar lower apertures smaller than the diameter of fruit to be received in said recess, means for moving said conveyor members and said bars along said plane, a flat plate below and immediately adjacent the bars passing along said plane, and means for moving said plate in a circular path with respect to said bars.

7. An orienting and pitting machine, comprising a plurality of bars 7 progressed over a horizontal plane by chains 6, each of said bars 7 having a plurality of fruit receiving recesses 8 therein, including lower apertures 9, an orienting plate 80 positioned beneath one or more bars in said plane, and means comprising arms 86 and connected shafts 87 for moving said plate relative to said bars.

ELLSWORTH W. CARROLL.